United States Patent
Srinivasan et al.

(10) Patent No.: US 11,301,455 B2
(45) Date of Patent: Apr. 12, 2022

(54) TECHNIQUE FOR GLOBAL DEDUPLICATION ACROSS DATACENTERS WITH MINIMAL COORDINATION

(71) Applicant: NetApp Inc., Sunnyvale, CA (US)

(72) Inventors: Kiran Nenmeli Srinivasan, Sunnyvale, CA (US); Kishore Kasi Udayashankar, Sunnyvale, CA (US); Swetha Krishnan, Sunnyvale, CA (US)

(73) Assignee: NetApp, Inc., San Jose, CA (US)

( * ) Notice: Subject to any disclaimer, the term of this patent is extended or adjusted under 35 U.S.C. 154(b) by 37 days.

(21) Appl. No.: 16/867,051

(22) Filed: May 5, 2020

(65) Prior Publication Data

US 2020/0265036 A1 Aug. 20, 2020

Related U.S. Application Data

(63) Continuation of application No. 15/681,527, filed on Aug. 21, 2017, now Pat. No. 10,685,013, which is a continuation of application No. 15/093,084, filed on Apr. 7, 2016, now Pat. No. 9,740,729, which is a continuation of application No. 14/054,984, filed on Oct. 16, 2013, now Pat. No. 9,336,260.

(51) Int. Cl.
*G06F 16/30* (2019.01)
*G06F 16/23* (2019.01)
*G06F 16/22* (2019.01)
*G06F 16/2455* (2019.01)
*G06F 3/06* (2006.01)

(52) U.S. Cl.
CPC .......... *G06F 16/2365* (2019.01); *G06F 3/067* (2013.01); *G06F 3/0608* (2013.01); *G06F 3/0641* (2013.01); *G06F 16/2228* (2019.01); *G06F 16/24568* (2019.01)

(58) Field of Classification Search
CPC .......... G06F 16/2365; G06F 16/24568; G06F 16/2228; G06F 16/1748; G06F 16/188; G06F 16/1458
USPC ........ 707/609, 687, 705, 769, 790, 813, 821
See application file for complete search history.

(56) References Cited

U.S. PATENT DOCUMENTS

| | | | |
|---|---|---|---|
| 2006/0282475 A1* | 12/2006 | Suermondt | G06F 16/20 |
| 2007/0255758 A1 | 11/2007 | Zheng et al. | |
| 2010/0114980 A1* | 5/2010 | Lillibridge | G06F 3/0689 |
| | | | 707/803 |
| 2010/0274772 A1* | 10/2010 | Samuels | G06F 16/188 |
| | | | 707/693 |

(Continued)

FOREIGN PATENT DOCUMENTS

| | | |
|---|---|---|
| CN | 102467572 A | 5/2012 |
| CN | 102722583 A | 10/2012 |
| CN | 103229147 A | 7/2013 |

OTHER PUBLICATIONS

International Search Report and Written Opinion for Application No. PCT/US2014/060367 dated Jan. 8, 2015, 13 pages.

*Primary Examiner* — Sana A Al-Hashemi
(74) *Attorney, Agent, or Firm* — Cooper Legal Group, LLC

(57) ABSTRACT

A system and method for global data de-duplication in a cloud storage environment utilizing a plurality of data centers is provided. Each cloud storage gateway appliance divides a data stream into a plurality of data objects and generates a content-based hash value as a key for each data object. An IMMUTABLE PUT operation is utilized to store the data object at the associated key within the cloud.

20 Claims, 6 Drawing Sheets

(56) References Cited

U.S. PATENT DOCUMENTS

| | | |
|---|---|---|
| 2011/0161291 A1* | 6/2011 | Taleck ................ G06F 11/1458 707/622 |
| 2011/0161723 A1* | 6/2011 | Taleck ................ G06F 16/1748 714/4.11 |
| 2012/0124012 A1 | 5/2012 | Provenzano et al. |
| 2013/0097380 A1 | 4/2013 | Colgrove et al. |
| 2013/0238876 A1 | 9/2013 | Fiske et al. |
| 2014/0074764 A1 | 3/2014 | Duftler et al. |
| 2014/0115182 A1 | 4/2014 | Sabaa et al. |

* cited by examiner

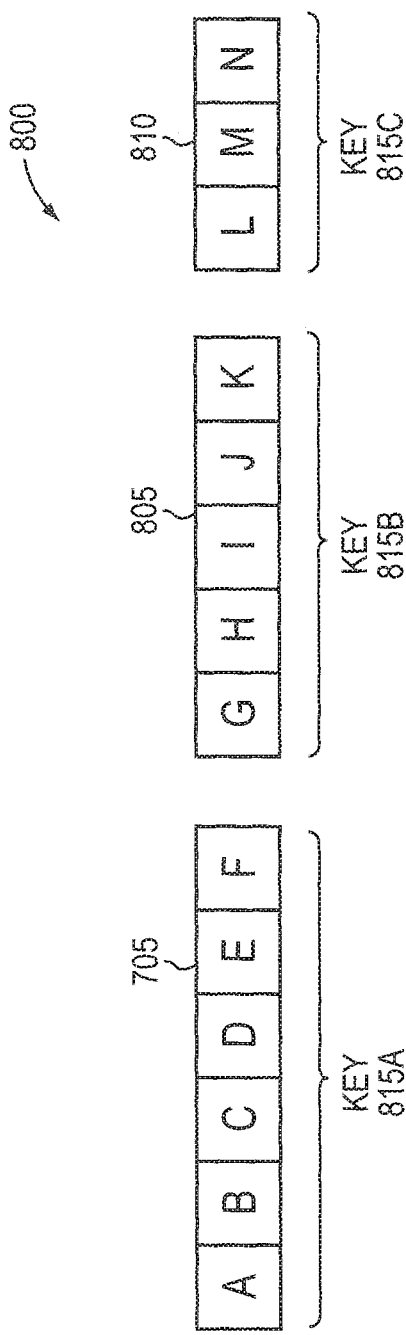

TECHNIQUE FOR GLOBAL DEDUPLICATION ACROSS DATACENTERS WITH MINIMAL COORDINATION

RELATED APPLICATIONS

This application claims priority to and is a continuation of U.S. application Ser. No. 15/681,527, filed on Aug. 21, 2017 and titled "TECHNIQUE FOR GLOBAL DEDUPLICATION ACROSS DATACENTERS WITH MINIMAL COORDINATION," which claims priority to and is a continuation of U.S. Pat. No. 9,740,729, filed on Apr. 7, 2016 and titled "TECHNIQUE FOR GLOBAL DEDUPLICATION ACROSS DATACENTERS WITH MINIMAL COORDINATION," which claims priority to and is a continuation of U.S. Pat. No. 9,336,260, filed on Oct. 16, 2013, titled "TECHNIQUE FOR GLOBAL DEDUPLICATION ACROSS DATACENTERS WITH MINIMAL COORDINATION," which are incorporated herein by reference.

BACKGROUND

Technical Field

The present disclosure relates to data de-duplication and, more specifically, to global data de-duplication in a cloud storage-based environment serving a plurality of data centers.

Background Information

Many large organizations may utilize cloud storage ("cloud") as a common, global repository for enterprise data that may be accessed and shared, i.e., served, across geographically separated data centers. These organizations typically employ well-known data de-duplication techniques to reduce or eliminate storage of duplicate data at the data center level. For example, in addition to data center level de-duplication, an organization may employ a "global de-duplication" technique that de-duplicates across data streams deposited into the cloud over networks, such a wide area network (WAN) links, from different offices of the data centers. An implementation of this global de-duplication technique may leverage the global repository to synchronize de-duplication metadata, e.g., fingerprints, across the offices. However, such an implementation becomes problematic as the number of global offices increase, thereby increasing network traffic across the WAN links from the data centers. In addition, any disruption in WAN connectivity between the offices may lead to stale de-duplication metadata.

One solution to this global de-duplication problem is to have each data center perform a local data de-duplication procedure to reduce the amount of data that is transmitted over the network for storage in the cloud. However, such a solution does not achieve optimal performance as redundant data that originates from different data centers may still be stored within the cloud. Another solution may be to install a data de-duplication engine within the cloud; however, computational costs within cloud storage environments are substantially high, thereby causing the cost of such a solution to be unacceptably high and sometimes impractical.

Thus, there is a need for a cost effective technique to achieve global data de-duplication in a cloud storage environment that serves a plurality of data centers.

BRIEF DESCRIPTION OF THE DRAWINGS

The advantages of the embodiments described herein may be better understood by referring to the following description in conjunction with the accompanying drawings in which like reference numerals indicate identically or functionally similar elements, of which:

FIG. 8 is a block diagram illustrating a plurality of data objects having been cut from a data stream; and FIG. 9 is a block diagram of an exemplary mappings data structure.

DESCRIPTION OF ILLUSTRATIVE EMBODIMENTS

Figure 1:
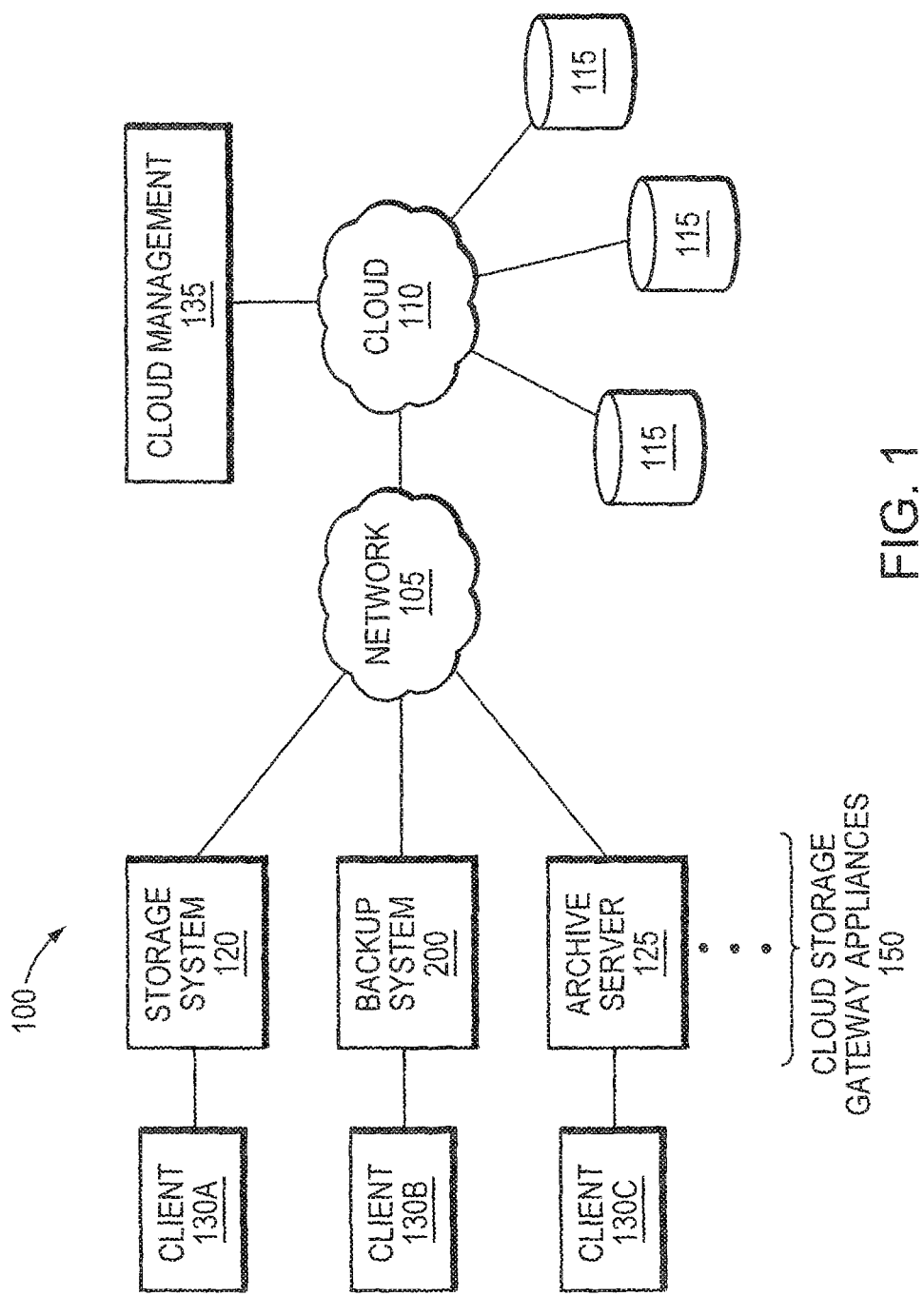
FIG. 1 is a schematic block diagram of an exemplary cloud storage environment.

Embodiments of the present invention are directed to a system and method for providing global data de-duplication in a cloud storage environment serving a plurality of data centers. The cloud storage environment may comprise a public cloud that multiplexes data from different companies and different administrative domains or a private cloud that serves a single administrative domain, such as that from a single entity, e.g., a company. At each of the data centers, one or more cloud storage gateway appliances provide an interface to manage the storage of data within the cloud. The cloud storage gateway appliances may embody, for example, storage systems, virtual tape libraries, archival servers, etc. Each cloud storage gateway appliance may be configured to chunk (divide) a data stream into one or more data objects for storage within the cloud. As used herein, a data stream may include, for example, a file, a backup, tape data stream, etc. that is divided into smaller sets of data blocks to form the data objects. Each data object is associated with a key as, e.g., a key-value pair, for storage within the cloud.

In an embodiment, the cloud storage gateway appliance may generate the key associated with the data object by utilizing a content-based hash of the data blocks within the data object. Illustratively, each data block may be a fixed size block of data, e.g., 4 kilobytes (4 KB), associated with an underlying file system layout utilized by the cloud storage gateway appliance. In an embodiment, the key for an object may comprise the concatenation of the content-based hashes corresponding to the underlying data blocks within the object. Illustratively, these data blocks are a fixed size of 4 KB; however, in alternative embodiments the data blocks may be of a different size. By utilizing a cryptographically strong hashing technique, the key associated with each data object may be understood to be unique among data objects having differing data contents with a very high probability.

After chunking the data stream into one or more data objects and generating a key for each data object, the cloud storage gateway appliance may attempt to store the data object within the cloud as a key-value pair by employing an IMMUTABLE PUT operation supported by the cloud storage provider. Illustratively, the IMMUTABLE PUT operation attempts to store the data object (value) at a location (key) within the cloud storage system. If no previous data object has been stored at the key location, the IMMUTABLE PUT operation stores the data object at the key location within the cloud storage system. In response, the cloud storage system returns a success indicator. However, if a data object has been previously stored at the key location, then the IMMUTABLE PUT operation returns a failure indicator and does not overwrite the previously written data. In other words, should the IMMUTABLE PUT operation return a success indicator, then the cloud storage system was able to successfully store the data object at the associated key location. However, if the IMMUTABLE PUT operation returns a failure indicator, then a previous data object was stored at the same key location. Thus, the failure indicator signifies that the data objects have identical contents and, as such, there is no need to store a duplicate copy. Therefore, the goal of global data de-duplication across data objects generated from a plurality of data streams that are using the same cloud storage system is achieved.

DESCRIPTION

FIG. 1 is a schematic block diagram of an exemplary cloud storage environment 100 in accordance with one or more embodiments described herein. The environment 100 is centered around a network 105 that may comprise any form of networking including, for example, a TCP/IP network, a virtual private network (VPN), a local area network (LAN) or a wide area network (WAN), such as the well-known Internet. As will be appreciated by those skilled in the art, the network 105 may comprise a plurality of different networks (not shown). It should be noted that various networks may comprise differing types and/or protocols in accordance with alternative embodiments described herein. In addition, portions of network 105 may comprise wired networks, wireless networks, etc., in accordance with the various embodiments. Thus, any description of network 105 embodied as Ethernet, Fibre Channel, etc. should be taken as exemplary only.

Operatively interconnected with the network 105 is a cloud storage system comprising a network cloud 110 operatively connected with a plurality of storage devices 115 and a cloud management system 135. The cloud storage system may comprise any type of public cloud storage environment including, for example, Amazon S3, Google Cloud Storage, Microsoft Azure Cloud, etc. Further, in alternative embodiments, private cloud storage deployments may be utilized such as those available from, e.g., Nutanix, CloudStack, OpenStack, etc. It should be noted that the network cloud 110 may, in alternative embodiments, comprise the network 105. That is, the network cloud 110 of the cloud storage system may comprise the same network 105 as utilized by the cloud storage environment. As such, the description of a separate network cloud 110 should be taken as exemplary only.

The cloud storage system offers a key-value lookup abstraction for accessing the data objects, wherein each data object is associated with a user-defined key that is utilized for storage/retrieval of the data object. Cloud storage gateway appliances, described further below, may communicate with the cloud storage system using primitive operations over, for example Hyper Text Transfer Protocol (HTTP).

In an embodiment, the primitive operations (primitives) include a GET primitive, a PUT primitive, a DELETE primitive and an IMMUTABLE PUT primitive, each of which may be provided by the cloud storage system. Illustratively, the cloud storage system may utilize the primitives to store data in a (key, value) pair relation. For example, the GET primitive illustratively takes as input a key, which causes the cloud storage system to return the value (i.e., data object) stored within the cloud storage system associated with the key. Similarly, the DELETE primitive takes as input a key and causes the deletion of the data object associated with the key. The PUT and IMMUTABLE PUT primitives take a (key, data object) pair as input. These two operations result in the cloud storage system attempting to store the data object in a storage location associated with the key. Illustratively, the difference between the PUT and IMMUTABLE PUT primitive operations is that if a data object has previously been stored at a key location, the PUT primitive will overwrite the previously stored data object with the new data object; however, the IMMUTABLE PUT primitive will not overwrite the previously stored data object and, instead, returns a failure indicator. As described further below, the IMMUTABLE PUT primitive operation enables global data de-duplication in a cloud storage environment when serving a plurality of data centers.

In an embodiment, one or more cloud storage gateway appliances 150 may be interconnected to network 105. Exemplary cloud storage gateway appliances 150 include, for example, storage system 120 that may serve a plurality of workloads including, e.g., primary and/or secondary workloads, archive server 125 and/or backup system 200 and in alternative embodiments backup/restore servers (not shown) and/or disaster recovery servers (not shown). More generally, a cloud storage gateway appliance 150 may comprise any device configured to store data within the cloud storage system. As such, the examples listed herein should be taken as exemplary only. The various cloud storage gateway appliances may be operatively interconnected with clients 130A-C via network 105. As such, the depiction of clients 130 being directly connected to the cloud storage gateway appliances should be taken as exemplary only.

In an embodiment, the cloud storage gateway appliance illustratively embodies a backup system 200 and, as such, the description contained herein is directed to such a backup system. However, as will be appreciated by those skilled in the art, differing devices may be utilized as cloud storage gateway appliances in alternative embodiments. In further alternative embodiments, a plurality of cloud storage gateway appliances of varying types may be utilized in storing data to the same cloud storage. As such, the description of a backup system 200 being a cloud storage gateway appliance should be taken as exemplary only.

Figure 2:
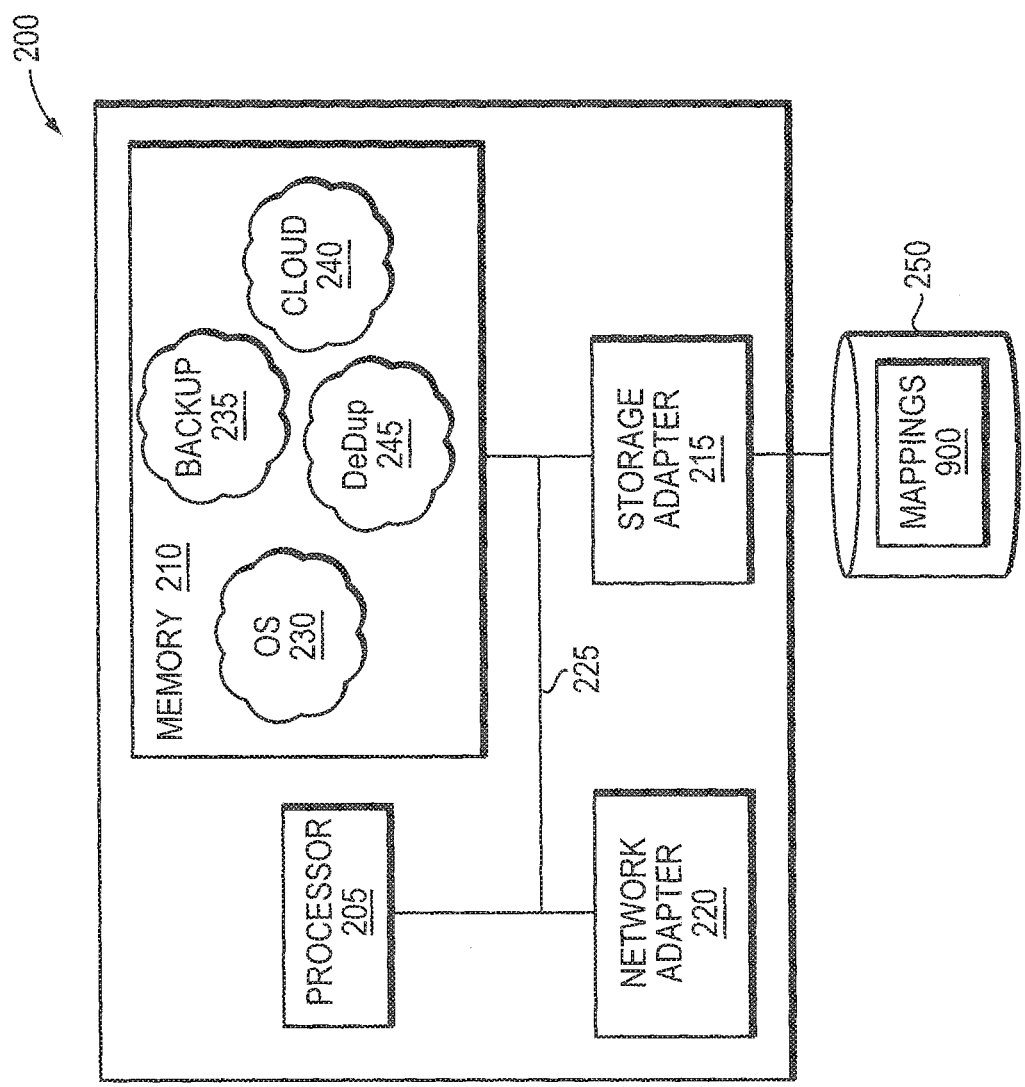
FIG. 2 is a schematic block diagram of a backup system (backup) system utilized as a cloud storage gateway appliance.

FIG. 2 is a schematic block diagram of an exemplary virtual tape library (backup) system 200 utilized as a cloud storage gateway appliance in accordance with one or more embodiments described herein. The backup system 200 illustratively comprises a processor 205, a memory 210, a network adapter 220 and a storage adapter 215 interconnected by a system bus 225. The memory 210 comprises storage locations that are addressable by the processor and adapters for storing software program code and data structures associated with the described embodiments. The processor and adapters may, in turn, comprise processing elements and/or logic circuitry configured to execute the software code and manipulate the data structures. Illustratively, the memory subsystem 210 stores a plurality of software modules including, for example, an operating system 230, a backup module 235, a cloud interface module 240 and a de-duplication module 245. It should be noted that in alternative embodiments additional and/or differing software modules may be utilized. As such, the modules described herein should be taken as exemplary only. Further, in alternative embodiments, various functionalities that are described herein as residing within the memory subsystem 210 may be implemented elsewhere within the backup system 200 including, for example, in software, hardware, firmware and/or in any combination thereof.

The operating system 230 may comprise a general purpose and/or specialized operating system used to organize backup system 200 and provide process and/or module management functionality. The backup module 235 implements the virtual tape library functionality of the system 200. The backup module 235 may be configured to provide the appropriate emulation capabilities of the system 200 to provide an appropriate interface to clients. The cloud module 240 operates in conjunction with the operating system 230, the backup module 235 and data de-duplication module 245 to manage the storage and/or retrieval of data from the cloud storage system. The cloud module 240 may be specifically configured to operate with a particular brand of cloud storage system or, in alternative embodiments, may be configured to operate with a plurality of cloud storage systems.

The data de-duplication module 245 implements global data de-duplication as described herein. Specifically, the data de-duplication module 245 may perform such functions as chunking of a data stream into data objects and, in conjunction with the cloud management module 240, storage of de-duplicated data within the cloud storage system. It will be apparent to those skilled in the art that other processing and memory means, including various non-transitory computer readable media, may be used for storing and executing program instructions pertaining to the inventive technique described herein.

The network adapter 220 comprises a plurality of ports configured to couple the backup storage system 200 to one or more clients 1308 over point-to-point links, wide area networks (WANs), virtual private networks (VPNs) implemented over a public network (Internet) or a shared local area network (LAN). The network adapter 220 thus may comprise the mechanical, electrical and signaling circuitry needed to connect the system 200 to the network 105.

The storage adapter 215 cooperates with the storage operating system 230, backup module 235 and/or cloud storage interface module 240 executing on the system 200 to control storage and retrieval of data on local storage 250. Illustratively, client data is stored on the cloud-based storage system; however, mapping data structures 900 (described below in reference to FIG. 9) may be stored locally to enable accurate re-creation of the virtual tape library data stream. Such mappings may be stored on local storage devices 250. The storage adapter 215 enables information, including such mappings data structures 900, to be stored on any attached form of storage device 250, such as videotape, optical, DVD, magnetic media, bubble memory, electronic random access memory, micro-electromechanical, flash or other solid-state media and/or any other similar media adapted to store information. Illustratively, the storage devices 250 may comprise disks such as a hard disk. However, it is expressly contemplated that in alternative embodiments, additional and/or differing storage devices 250 (e.g., Flash based storage devices, Storage Class memory devices, etc.) may be utilized. As such the description of disks being used as storage devices 250 should be taken as exemplary only. The storage adapter may include input/output (I/O) interface circuitry that couples to the storage devices 250 over an I/O interconnect arrangement, such as a conventional high-performance, FC serial link topology.

Figure 3:
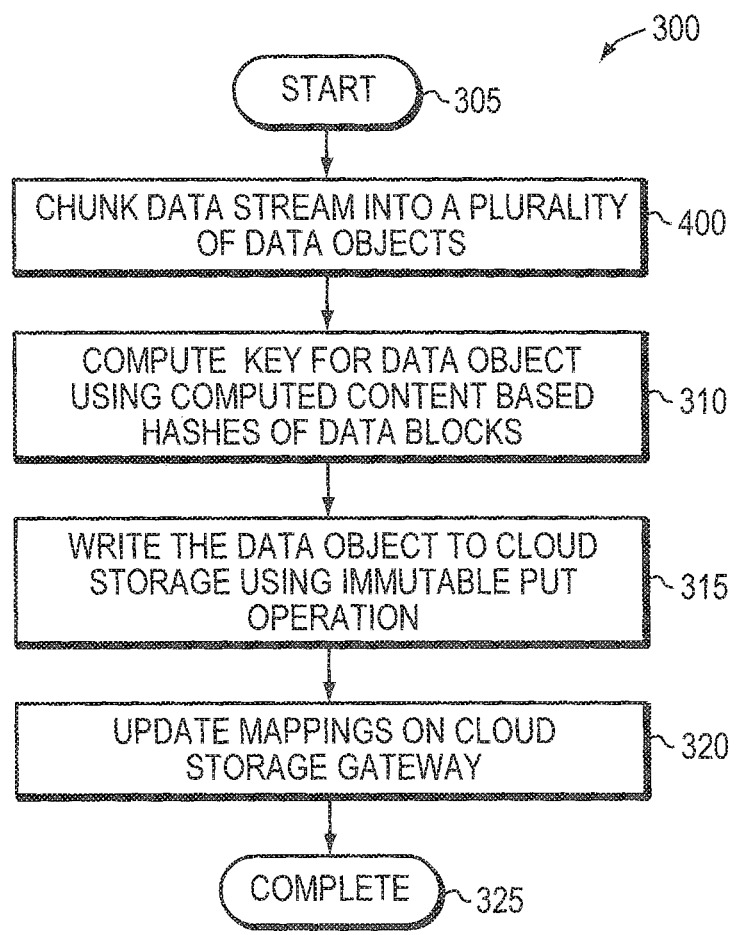
FIG. 3 is a flowchart detailing the steps of a procedure for performing global data de-duplication in a cloud storage environment.

FIG. 3 is a flowchart detailing the steps of a procedure 300 for performing global data de-duplication in a cloud storage environment in accordance with an illustrative embodiment described herein. The procedure 300 begins in step 305 continues to step 400 where the data stream to be stored within the cloud storage system is chunked (divided) into a plurality of data objects. One exemplary chunking technique is described below in reference to procedure 400 of FIG. 4. However, it should be noted that any technique for chunking a data stream into a plurality of data objects may be utilized in accordance with alternative embodiments. As such, the description contained herein in relation to procedure 400 should be taken as exemplary only. Generally, the chunking procedure performs one or more operations on the data stream to form smaller data objects, each of which will be individually stored as a (key, value) pairing within the cloud storage system. That is, each data object (value) is stored at a location (key) within the cloud storage system identified by the key. Thus, the creation of data objects from the data stream whose boundaries are defined by exclusively by the content is key. This ensures that when identical, or partially overlapping content, is present in another co-resident data stream (i.e., a stream stored in the same cloud storage system) they will be assigned to data objects with the exact same boundaries.

It should be noted that the data objects may comprise fixed size data objects or may be variable length data objects. The chunking technique described below in reference to FIG. 4 results in variable length data objects; however, it should be noted that variable length chunking is exemplary only. One example of a variable length chunking technique is described below in reference to FIG. 4. One alternative chunking technique is described in U.S. Patent Publication No. 2007/0255758, entitled SYSTEM AND METHOD FOR SAMPLING BASED ELIMINATION OF DUPLICATE DATA, by Yuval Frandzel, et al.

Once the data stream has been chunked into a plurality of data objects, a key is computed for each data object using previously computed content-based hash of the data blocks within the data object in step 310. Illustratively, the computed key for a data object is a simple concatenation of the content-based hashes of the data blocks that comprise the data object. Should the concatenated hashes exceed a pre-defined key size limit, a second hash of the content-based hashes may be utilized to compute the key. That is, the concatenated hashes may be hashed to generate a content bashed hash value that is within a predefined size limit. The concatenated length may exceed a predefined maximum size when, e.g., the length of a data object is substantially large. As noted below in reference to FIG. 4, exemplary chunking techniques impose a maximum length of a data object. When using such chunking techniques, the possibility of relatively long concatenated hashes is substantially reduced. More generally, step 310 involves creating a unique key that is based on the content of the blocks of data within the data object. Associating each data object with a key that is content based enables efficient identification of duplicate data objects as those objects will share the same content based key. Advantageously, if each data center utilizes the same chunking and hashing techniques, then no inter-data center communication is needed to determine whether duplicate data exists. As noted below, such duplicate data, identified by identical keys, will not be stored by the cloud storage system's IMMUTABLE PUT primitive operation.

The cloud storage gateway appliance may then write the data object to the cloud storage using the cloud storage system's IMMUTABLE PUT operation in step 315. As noted above, a cloud storage system's IMMUTABLE PUT operations illustratively returns one of two result indicators. If a success indicator is returned, then the data has been successfully stored in the cloud at an associated key location. If a failure indicator is returned, then data has already been stored at the location identified by the same key. If data having the same key has previously been stored within the cloud storage system, then the data attempting to be stored is identical to the previously stored data. Similarly, if a data object has been previously stored at the same key location, then the data object has the same content based hash key as previously stored data. In an embodiment, all cloud storage gateway appliances utilize the same chunking and hashing procedure; thus, if two data objects have the same hash key, then they have identical content. As such, there is no need to store a redundant copy of the data. By utilizing a strong content-based hash in creating the keys (for the data objects), global data de-duplication may be achieved among the plurality of data centers with no direct communication among the data centers. This enables rapid data de-duplication on a global basis and obviates the need for computationally expensive systems that share keys among storage systems. That is, if all of the cloud storage gateway appliances utilize the same chunking technique and same content based hashes, then no inter-cloud storage gateway appliance communication is needed to enable global data de-duplication. A noted advantage of the embodiments described herein is the elimination of communication among various cloud storage gateway appliances, either within a single data center or among a plurality of data centers. In this way, the need to share keys among cloud storage gateway appliances is obviated as well as the need to ensure that each cloud storage gateway appliance is synchronized with other appliances utilizing the cloud storage.

The procedure then continues to update the mappings on the cloud storage gateway in step 320. As described below in reference to FIG. 9, a cloud storage gateway appliance, such as an exemplary backup system 200, may utilize a mappings data structure 900 for storing the proper sequence of data objects within the data stream.

Figure 4:
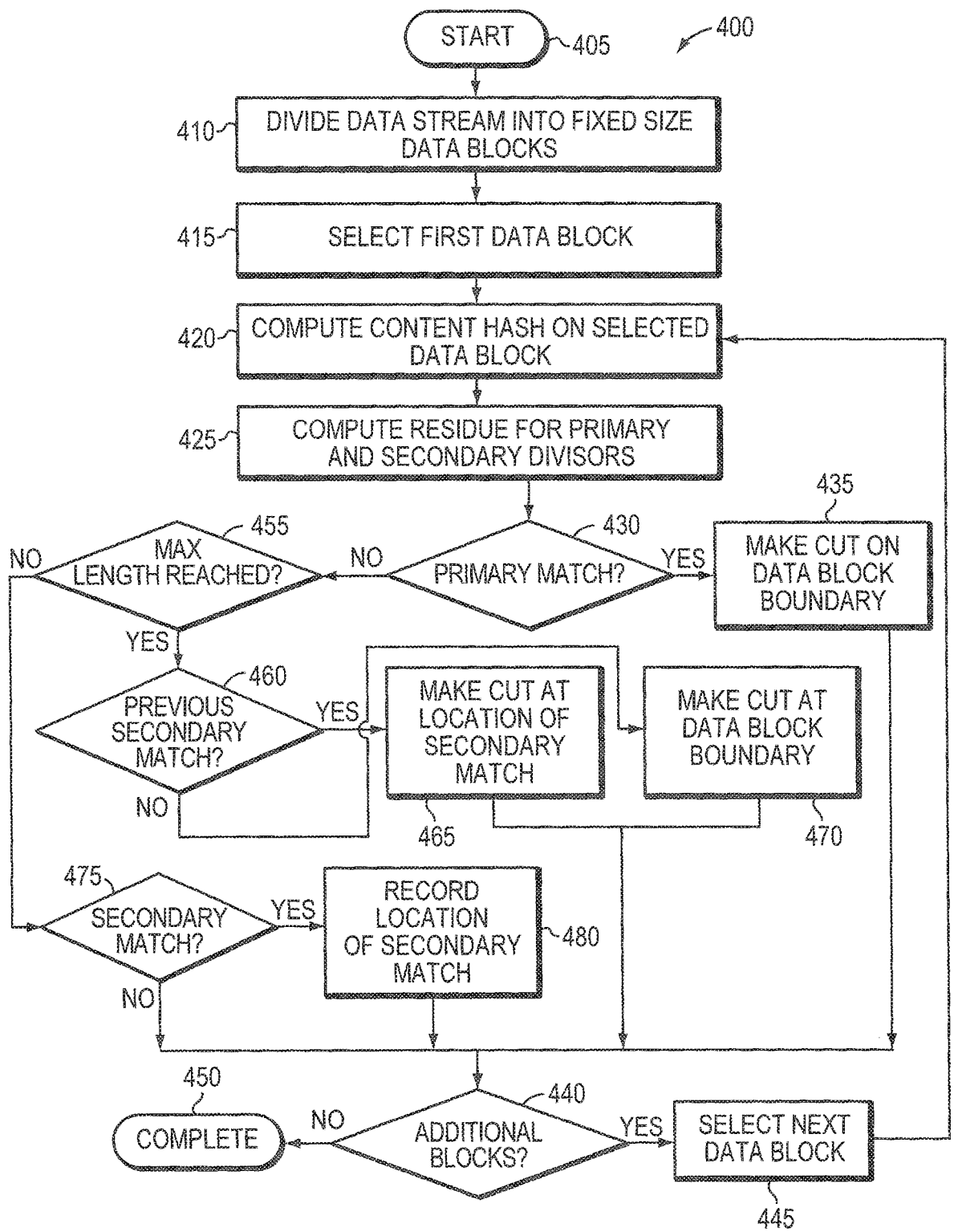
FIG. 4 is a flowchart detailing the steps of a procedure for chunking a data stream into a plurality of data objects.

FIG. 4 is a flowchart detailing the steps of a procedure 400 for chunking a data stream into a plurality of data objects in accordance with an illustrative embodiment described herein. It should be noted that the description herein is provided in terms of a variation of the Two Thresholds, Two Divisors (TTTD) algorithm. The TTTD algorithm is described in A Framework for Analyzing and Improving Content-Based Chunking Algorithms, by Kave Eshgi, et al., HPL-2005-30(R.1), dated Sep. 22, 2005, the contents of which are hereby incorporated by reference. The TTTD algorithm utilizes a sliding window along the data stream. The contents of the sliding window are hashed and then divided by a primary divisor as well as a secondary divisor. The secondary divisor is illustratively smaller than the primary divisor, which increases the chance of finding a match. Generally, a match occurs when the hash of the data within the sliding window modulo the divisor equals a predefined value.

That is, a match occurs when:

$h(W) \bmod D = r$ where h( ) signifies a hashing function, W represents the data contents of a sliding window, D represents the divisor and r represents a residue value. In the case of TTTD, a secondary match occurs when:

$h(W) \bmod D' = r$ where D' represents the secondary divisor.

However, it should be noted that any chunking technique may be utilized in accordance with alternative embodiments. As such, the description contained herein should be taken as exemplary only.

Procedure 400 begins in step 405 and continues to step 410 where the data stream is divided into fixed size data blocks. Illustratively, the fixed size data blocks are 4 kilobytes (KB) in size. However, the data stream may be divided into any fixed size data blocks. Illustratively, the fixed sized data blocks may be associated with block sizes utilized by a file system associated with the cloud storage gateway appliance and/or with clients of the cloud storage gateway appliance. As such, the description of 4 KB data blocks should be taken as exemplary only. A first data block is then selected in step 415 and a content based hash is computed on the selected data block in step 420.

Figure 5:
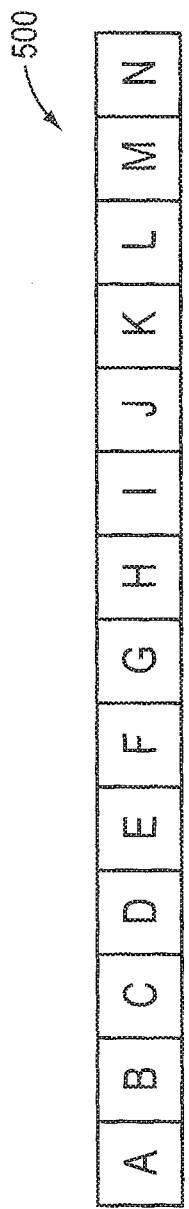
FIG. 5 is a block diagram of an exemplary data stream.
Figure 6:
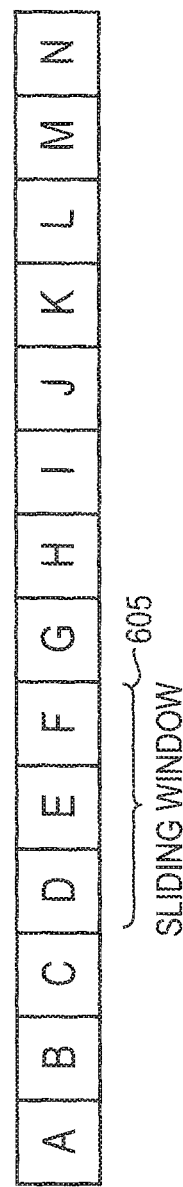
FIG. 6 is a block diagram of an exemplary data stream illustrating a sliding window.

FIG. 5 is an exemplary block diagram of a data stream 500. Exemplary data stream 500 includes a plurality of fixed sized blocks A-N. In an illustrative embodiment, fixed sized blocks A-N are 4 KB in length; however, in alternative embodiments, the fixed sized blocks may be of a differing length. FIG. 6 is block diagram of an exemplary data stream illustrating a sliding window 605 in accordance with an illustrative embodiment described herein. It should be noted that in FIG. 6 the sliding window is illustrated as encompassing three (3) fixed sized blocks; however, in alternative embodiments, the sliding window may be of a differing length. As such, the description of a sliding window being any particular size should be taken as exemplary only.

Illustratively, the content based hash may be computed using a secure cryptographic hash function such as SHA-1, MD 5, SHA-256, SHA-3, etc. By utilizing a strong hash function, the hash values will be unique for data that is different, i.e., for any two data blocks having differing data, they will have differing hash values. The procedure then, in step 425, computes a residue from the primary and secondary divisors. As noted above, the TTTD algorithm computes h(W) mod D and h(W) mod D' to generate a residue value r. The hash value h(W) comprises a hash of the blocks within a sliding window 605. In step 430, a determination is made as to whether there is a match on the primary divisor. If there is, the procedure 400 branches to step 435 where a cut is made on a data block boundary.

Figure 7:
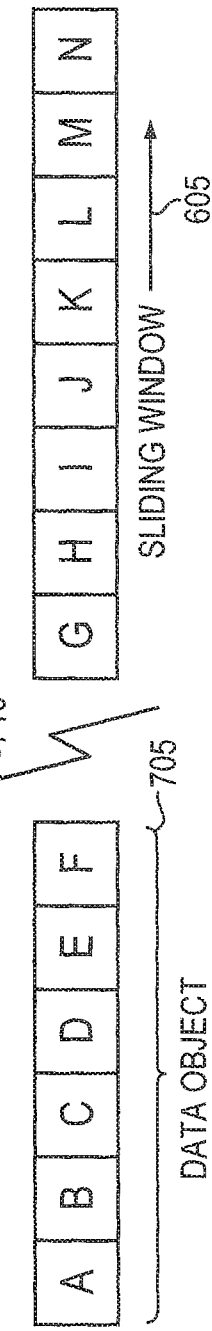
FIG. 7 is a block diagram of an exemplary data stream having been cut in accordance with a chunking algorithm.

FIG. 7 is an exemplary block diagram illustrating a data object having been cut in accordance with an illustrative embodiment described herein. In this exemplary diagram, fixed sized data blocks A-F are cut into a data object 705, wherein the cut 710 occurs at the end of block F. The sliding window 605 continues to move along the remainder of the data stream 700.

FIG. 8 is a block diagram illustrating a plurality of data objects having been cut from a data stream in accordance with an illustrative embodiment described herein. In exemplary environment 800, the data stream 500 has been cut into three data objects 705, 805 and 810, each of which has an associated content based hash key 815A-C.

Once the cut has been made, the procedure 400 moves to step 440 where a determination is made as to whether there are additional data blocks in the data stream. If there are no additional data blocks, the procedure then completes in step 450. However, if in step 440, it is determined that additional data blocks exist, the procedure 400 branches to step 445 where the next data block is selected. The procedure then branches back to step 420 to compute the content based hash of the selected data block. That is, the newly selected data block is rolled into the sliding window (with the oldest block in the window exiting).

Returning to step 430, if no primary match exists, the procedure 400 then branches to step 455 where a determination is made as to whether a maximum length of the data object has been reached. If the maximum length has been reached, the procedure continues to step 460 where a determination is made as to whether a previous secondary match had been noted within the current data object. If a secondary match had been noted, the procedure 400 makes a cut at the location of the secondary match in step 465. The procedure then continues to step 440 to determine whether additional blocks need to be processed. However, if in step 460 it is determined that there has been no previous secondary match, the procedure continues to step 470 where a cut is made at the end of the data block boundary at the end of the maximum length. The procedure 400 then continues to step 440 to determine if additional data blocks are to be processed.

Returning to step 455, if the maximum length has not been reached, the procedure 400 branches to step 475 to determine whether a secondary match exists. If the secondary match exists, the procedure 400 continues to step 480 and records the location of the secondary match in temporary storage. The procedure then continues to step 440 where a determination is made as to whether additional blocks are to be processed.

FIG. 9 is an exemplary mapping data structure 900 in accordance with an illustrative embodiment described herein. Illustratively, data is stored within the cloud storage system; however, metadata, specifically metadata relating to the order and the structure of a data stream, is retained by the cloud storage gateway appliance. Exemplary mapping data structure 900 may be utilized by backup system 200 to ensure that the various data objects that comprise a data stream may be retrieved in the proper order to re-create the data stream. Illustratively, the mappings data structure 900 comprises of a plurality of entries 905A-D, each of which stores a key 815 that is associated with a data object. Exemplary mappings data structure 900 is shown with three filled entries 905A-C storing keys 815A-C respectively. In this example, the mappings data structure 900 stores sufficient information to retrieve data objects 705, 805 and 810 (see FIG. 8) of data stream 500. By storing the keys in the order that data objects exist within the data stream, the backup system 200 may retrieve and present the data stream in response to a data access request.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a non-transitory computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   dividing a data stream into fixed size data blocks;
   applying a sliding window to the fixed size data blocks, wherein the sliding window is applied to a first subset of the fixed size data blocks;
   computing a first hash of the first subset of the fixed size data blocks;
   in response to a determination that a first cut is to be made along a first data block boundary of the first subset of the fixed size data blocks based upon the first hash, generating a data object to comprise the first subset of the fixed size data blocks;
   generating a key as a unique identifier for referencing and accessing the data object, wherein the key is generated to include a concatenation of a plurality of content-based hashes together, wherein the plurality of content-based hashes are of the fixed sized data blocks in the data object; and
   storing the data object and the key as a key-value pair within cloud storage.

2. The method of claim 1, comprising:
   determining a size of a fixed size data block based upon a block size utilized by a file system of a cloud storage gateway appliance.

3. The method of claim 1, comprising:
   determining a size of a fixed size data block based upon a block size utilized by a file system of a client of a cloud storage gateway appliance.

4. The method of claim 1, wherein the fixed size data blocks have a same length.

5. The method of claim 1, wherein a first fixed size data block has a different length than a second fixed size data block.

6. The method of claim 1, comprising:
   in response to a determining that the first cut is not to be made, applying the sliding window to a second subset of the fixed size data blocks.

7. The method of claim 6, wherein a second hash of the second subset of the fixed size data blocks is computed, and the method comprising:
   in response to a determination that a second cut is to be made along a second data block boundary of the second subset of the fixed size data blocks based upon the second hash, generating the data object to comprise the second subset of the fixed size data blocks.

8. The method of claim 6, wherein the sliding window is applied to the second subset of the fixed size data blocks based upon a maximum length for data objects not being reached.

9. The method of claim 1, comprising:
   storing the data object within a cloud storage environment using a cloud storage gateway appliance.

10. The method of claim 9, comprising:
    maintaining a mapping data structure to track storage of the data object within the cloud storage environment.

11. The method of claim 1, comprising:
    storing the data object as a sequence of data objects within a cloud storage environment using a cloud storage gateway appliance.

12. A computing device comprising:
    a memory comprising machine executable code having stored thereon instructions for performing a method; and a processor coupled to the memory, the processor configured to execute the machine executable code to cause the processor to:
- divide a data stream into fixed size data blocks;
- apply a sliding window to the fixed size data blocks, wherein the sliding window is applied to a first subset of the fixed size data blocks;
- compute a first hash of the first subset of the fixed size data blocks;
- in response to a determination that a first cut is to be made along a first data block boundary of the first subset of the fixed size data blocks based upon the first hash, generate a data object to comprise the first subset of the fixed size data blocks;
- generate a key as a unique identifier for referencing and accessing the data object, wherein the key is generated to include a concatenation of a plurality of content-based hashes together, wherein the plurality of content-based hashes are of the fixed sized data blocks in the data object; and
- store the data object and the key as a key-value pair within cloud storage.

13. The computing device of claim 12, wherein the machine executable code causes the processor to:
- determine a size of a fixed size data block based upon a block size utilized by a file system of a cloud storage gateway appliance.

14. The computing device of claim 12, wherein the machine executable code causes the processor to:
- determine a size of a fixed size data block based upon a block size utilized by a file system of a client of a cloud storage gateway appliance.

15. The computing device of claim 12, wherein the fixed size data blocks have a same length.

16. The computing device of claim 12, wherein a first fixed size data block has a different length than a second fixed size data block.

17. The computing device of claim 12, wherein the machine executable code causes the processor to:
- in response to a determining that the first cut is not to be made, apply the sliding window to a second subset of the fixed size data blocks.

18. The computing device of claim 17, wherein a second hash of the second subset of the fixed size data blocks is computed, and the method comprising:
- in response to a determination that a second cut is to be made along a second data block boundary of the second subset of the fixed size data blocks based upon the second hash, generate the data object to comprise the second subset of the fixed size data blocks.

19. The computing device of claim 17, wherein the sliding window is applied to the second subset of the fixed size data blocks based upon a maximum length for data objects not being reached.

20. A non-transitory machine readable medium comprising instructions for performing a method, which when executed by a machine, causes the machine to:
- divide a data stream into fixed size data blocks;
- apply a sliding window to the fixed size data blocks, wherein the sliding window is applied to a first subset of the fixed size data blocks;
- compute a first hash of the first subset of the fixed size data blocks;
- in response to a determination that a first cut is to be made along a first data block boundary of the first subset of the fixed size data blocks based upon the first hash, generate a data object to comprise the first subset of the fixed size data blocks;
- generate a key as a unique identifier for referencing and accessing the data object, wherein the key is generated to include a concatenation of a plurality of content-based hashes together, wherein the plurality of content-based hashes are of the fixed sized data blocks in the data object; and
- store the data object and the key as a key-value pair within cloud storage.

* * * * *